(12) United States Patent
Yoon (10) Patent No.: US 7,532,289 B2
(45) Date of Patent: May 12, 2009

(54) METHOD FOR FABRICATING COLOR FILTER SUBSTRATE FOR A LIQUID CRYSTAL DISPLAY DEVICE WITH COLOR FILTER HAVING POLARIZING FUNCTION

(75) Inventor: Sunghoe Yoon, Annyang-si (KR)

(73) Assignee: LG Display Co., Ltd., Seoul (KR)

( * ) Notice: Subject to any disclaimer, the term of this patent is extended or adjusted under 35 U.S.C. 154(b) by 279 days.

(21) Appl. No.: 10/951,726

(22) Filed: Sep. 29, 2004

(65) Prior Publication Data

US 2005/0110941 A1 May 26, 2005

(30) Foreign Application Priority Data

Nov. 24, 2003 (KR) ........................ 10-2003-0083423

(51) Int. Cl.
*G02F 1/1333* (2006.01)
*G02F 1/1335* (2006.01)

(52) U.S. Cl. .......................... 349/122; 349/96; 349/97; 349/106; 349/138; 349/187; 428/1.5

(58) Field of Classification Search .................. 349/96, 349/97, 106, 122, 138, 187; 428/1.5
See application file for complete search history.

(56) References Cited

U.S. PATENT DOCUMENTS

| | | | | |
|---|---|---|---|---|
| 4,560,241 A | * | 12/1985 | Stolov et al. | 349/97 |
| 4,601,546 A | * | 7/1986 | Ohta | 349/3 |
| 6,399,166 B1 | * | 6/2002 | Khan et al. | 428/1.31 |
| 6,450,635 B1 | * | 9/2002 | Okabe et al. | 347/106 |
| 6,558,858 B2 | * | 5/2003 | Ueda et al. | 430/7 |
| 6,630,274 B1 | * | 10/2003 | Kiguchi et al. | 430/7 |
| 6,727,034 B1 | * | 4/2004 | Ogiso et al. | 430/176 |
| 7,423,707 B2 | * | 9/2008 | Yoon | 349/96 |

FOREIGN PATENT DOCUMENTS

| | | |
|---|---|---|
| EP | 0 961 138 A1 | 12/1999 |
| KR | 10-2003-0026736 A | 3/2003 |
| WO | WO-94/28073 A1 | 12/1994 |

* cited by examiner

*Primary Examiner*—Andrew Schechter
(74) *Attorney, Agent, or Firm*—Birch, Stewart, Kolasch & Birch, LLP (57) ABSTRACT

A display device and a method of fabricating a color filter substrate for the display device are provided. The method includes forming a black matrix on a substrate having a pixel region, forming a color filter layer including a lyotropic liquid crystal material over the substrate, applying shear force to a surface of the color filter layer in a first direction, and forming a common electrode over the color filter layer.

31 Claims, 12 Drawing Sheets

METHOD FOR FABRICATING COLOR FILTER SUBSTRATE FOR A LIQUID CRYSTAL DISPLAY DEVICE WITH COLOR FILTER HAVING POLARIZING FUNCTION

The present invention claims the benefit of Korean Patent Application No. 2003-0083423 filed in Republic of Korea on Nov. 24, 2003, which is hereby incorporated by reference.

BACKGROUND OF THE INVENTION

1. Field of the Invention

The present invention relates to a liquid crystal display (LCD) device, particularly, to a color filter substrate for the LCD device and a fabricating method of the color filter substrate wherein the color filter layer of the color filter substrate is made of lyotropic liquid crystal and acts as a polarizer.

2. Discussion of the Related Art

LCD devices are developed as the next generation display devices because of their lightweight, thin profile, and low power consumption characteristics. In general, an LCD device is a non-emissive display device that displays images using a refractive index difference having optical anisotropy properties of liquid crystal material that is interposed between a thin film transistor (TFT) array substrate and a color filter (C/F) substrate. Presently, among the various types of LCD devices commonly used, active matrix LCD (AM-LCD) devices have been developed because of their high resolution and superiority in displaying moving images. The AM-LCD device includes a TFT per each pixel region as a switching device, and first and second electrodes, the second electrode being used as a common electrode.

The LCD device includes upper and lower substrates, and a liquid crystal layer interposed therebetween. The upper substrate and lower substrate are commonly referred to as a color filter substrate and an array substrate, respectively. A common electrode and color filter layers are formed on the upper substrate through processes for fabricating a color filter substrate. Similarly, TFTs and pixel electrodes are formed on the lower substrate through processes for fabricating an array substrate.

A liquid crystal display device according to a related art is explained in detail with reference to FIG. 1 which shows a perspective view of an LCD device according to the related art.

Figure 1:
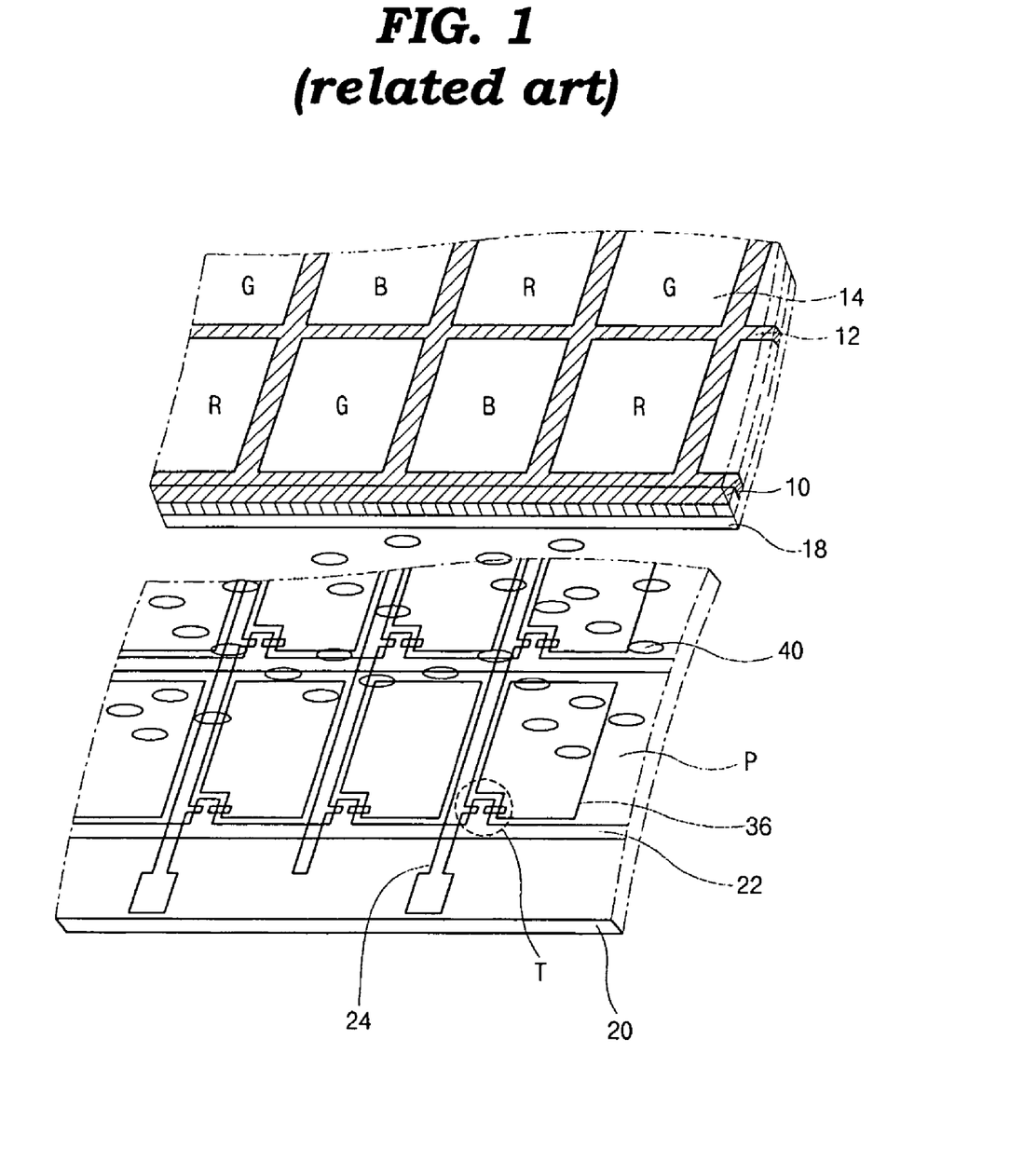
FIG. 1 is a perspective view showing a liquid crystal display device according to a related art.

Referring to FIG. 1, upper and lower substrates 10 and 20 are arranged to face each other with a liquid crystal layer 40 interposed therebetween. On an inner surface of the upper substrate 10, a color filter layer 14 and a common electrode 18, which functions as one electrode for applying an electric field to the liquid crystal layer 40, are subsequently formed. The color filter layer 14 includes reed, green and blue sub color filters for passing only the light of a specific wavelength, and a black matrix 12 that is disposed in the boundary regions of the sub color filters and shields the light from the regions in which the alignment of the liquid crystal layer 40 is uncontrollable. On an inner surface of the lower substrate 20, a plurality of gate lines 22 and a plurality of data lines 24 are formed in a matrix array. A thin film transistor T, which functions as a switching device, is disposed at a region where each gate line 22 and data line 24 crosses, and a pixel electrode 36 that is connected to a thin film transistor T is disposed at each pixel region P defined by the region where the corresponding gate and data lines 22 and 24 cross.

Although not shown, this LCD panel further includes upper and lower polarizing plates which are placed on the backsides of the upper and lower substrates 10 and 20. A backlight unit which includes a lamp and an optical sheet, and top and bottom cases supporting the LCD panel is placed on the backside of the lower substrate 20.

Figure 2:
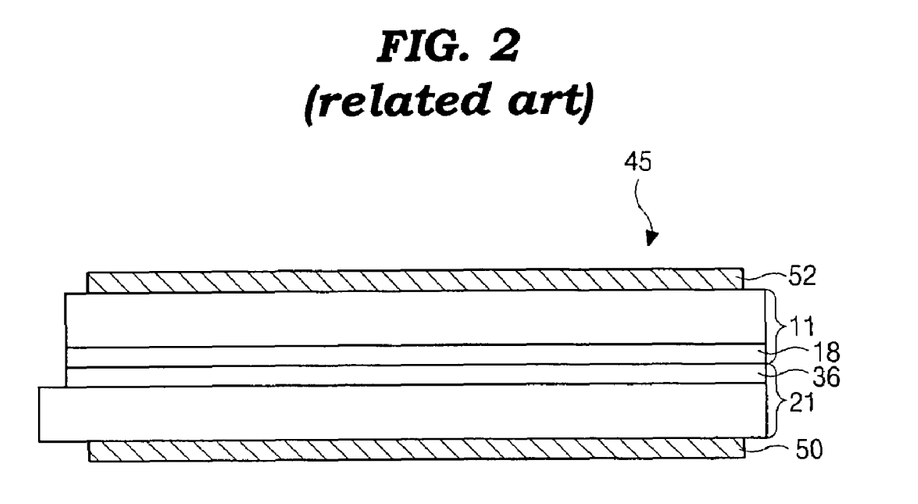
FIG. 2 is a schematic cross sectional view showing an LCD device having polarizing plates according to a related art.

FIG. 2 is a schematic cross sectional view showing an LCD device having polarizing plates according to a related art.

In FIG. 2, an LCD panel 45 includes an array substrate 21, a color filter substrate 11 facing the array substrate 21, a first polarizing plate 50 on the backside of the array substrate 21 and a second polarizing plate 52 on the backside of the color filter substrate 11. Although not shown, a liquid crystal layer is disposed between the color filter substrate 11 and the array substrate 21

Among them, the array substrate 21 includes a plurality of thin film transistors T shown in FIG. 1 and a plurality of pixel electrodes 36 each connected to the corresponding thin film transistor T. The color filter substrate 11 includes a color filter layer 14 and a common electrode 18. The pixel electrode 36 is practically formed in each pixel region P shown in FIG. 1 in comparison with the common electrode 18.

Generally, the color filter layer 14 includes red, green and blue sub-color filters which are arranged in order. Each of the red, green and blue sub-color filters is located to correspond to each pixel region P as shown in FIG. 1. The color filter layer 14 is manufactured by a pigment dispersion method known to have a good elaborateness and reproducibility.

Hereinafter, a fabricating method of the color filter substrate by the pigment dispersion method will be explained referring to FIGS. 3A-3D. Particularly, FIGS. 3A to 3D are schematic cross sectional views showing a fabricating process by a pigment dispersion method of a color filter substrate for an LCD device according to a related art.

Figure 3A:
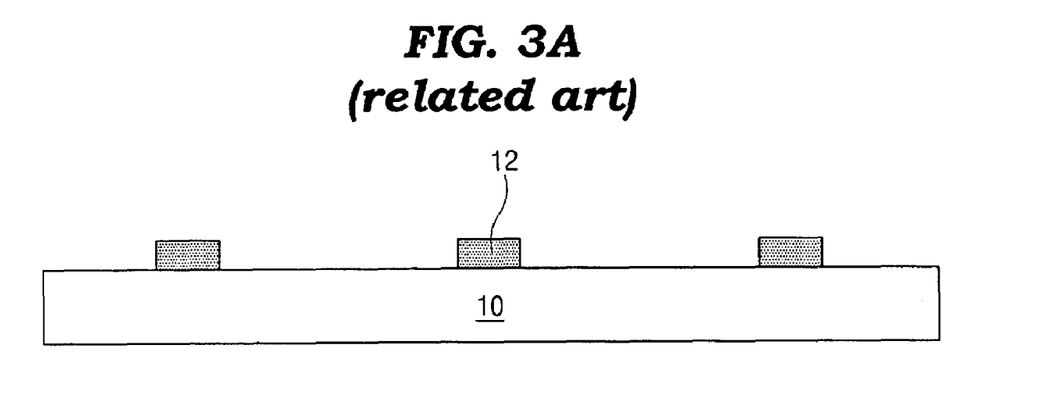
FIGS. 3A to 3D are schematic cross sectional views showing a fabricating process by a pigment dispersion method of a color filter substrate for an LCD device according to a related art.

In FIG. 3A, a black matrix 12 is formed by coating (or depositing) a light blocking material such as black resin and chromium (Cr) based materials on a substrate 10. For example, the black matrix 12 may be patterned and manufactured by photolithography using a photoresist pattern. The black matrix 12 is located in the boundaries of the pixel regions P in order to prevent leakage and to shield the thin film transistors T from incident lights as shown in FIG. 1.

Figure 3B:
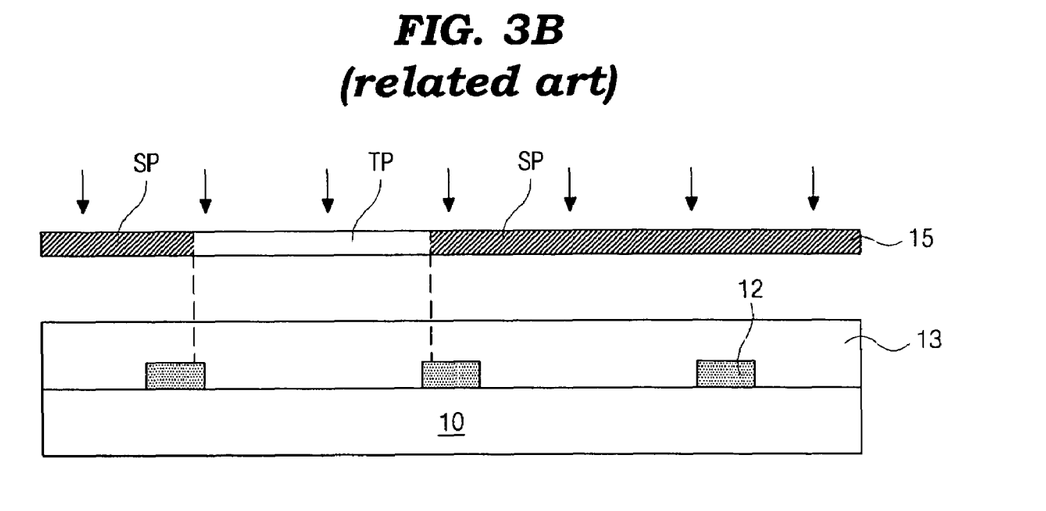

In FIG. 3B, a red resist layer 13 is formed by spin coating or bar coating of a red resist material over the entire surface of the substrate 10 including the black matrix 12.

Next, a mask 15 having a transmissive portion TP and a shielding portion SP is disposed over the substrate 10 having the black matrix 12, and then the red resist layer 13 of the substrate 10 is exposed to UV light through the mask 15.

For example, the red resist layer 13 is a negative type material such that an exposed portion of the red resist layer 13 is patterned into a red sub-color filter pattern. Therefore, the transmissive portion TP of the mask 15 corresponds to the portion of the red resist layer 13 that will be patterned into a red sub-color filter during the step of exposing.

Figure 3C:
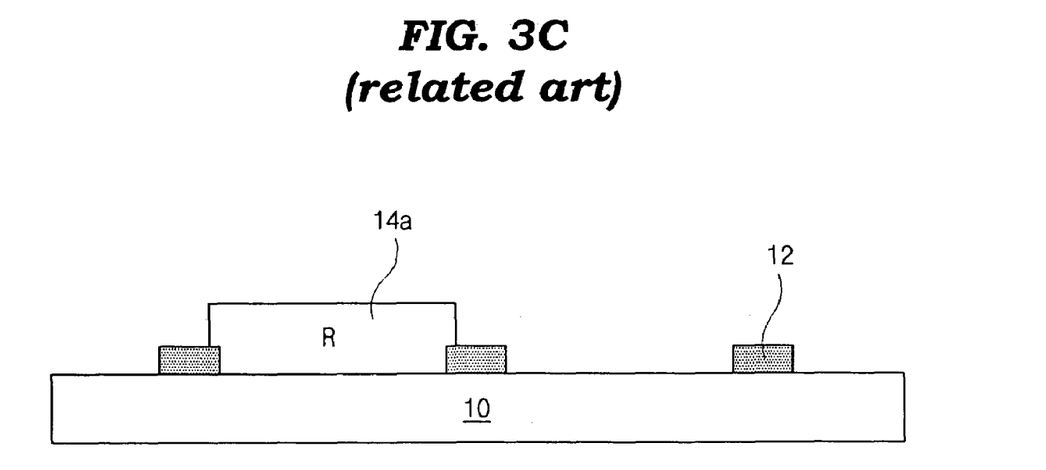

In FIG. 3C, the exposed portion of the red resist layer 13 shown in FIG. 3B is patterned into a red sub-color filter 14a by developing the exposed portion of the red resist layer 13. Next, curing the red sub-color filter 14a is performed to cure the red sub-color filter 14a.

Figure 3D:
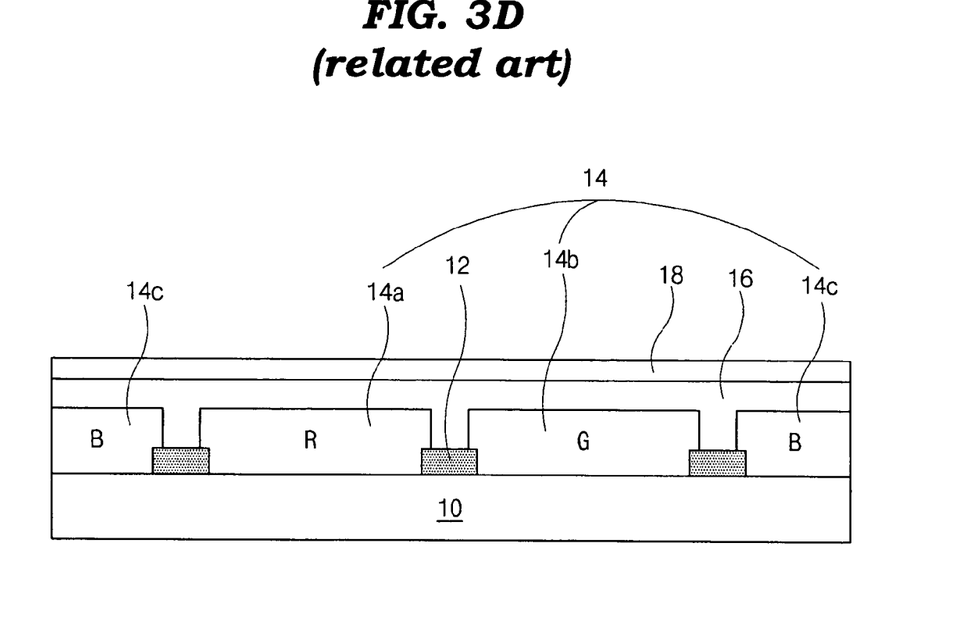

In FIG. 3D, green and blue sub-color filters 14b and 14c are sequentially formed by the same processes as the process of forming the red sub-color filter 14a. The green and blue sub-color filters 14b and 14c are made of green and blue resist materials, respectively. The red, green and blue sub-color filters 14a, 14b and 14c constitute a color filter layer 14.

Next, an overcoat layer 16 is formed on the entire surface of the color filter layer 14 over the substrate 10, and a common electrode 18 is formed using transparent conductive materials including indium tin oxide (ITO), indium zinc oxide (IZO)

and indium tin zinc oxide (ITZO) on the overcoat layer 16. The overcoat layer 16 is specifically formed to protect the color filter layer 14 and to compensate for the step height of the color filter layer 14.

As explained above, the color filter substrate according to the related art is manufactured through the multiple steps of coating, exposing, developing and curing the color resist materials. After aligning the manufactured color filter substrate and the array substrate to face to each other, an LCD panel is manufactured by attaching the color filter substrate and the array substrate and by interposing a liquid crystal layer between the color filter substrate and the array substrate. Next, by attaching polarizing plates on the backsides of the color filter substrate and the array substrate, respectively, the LCD panel is completed.

Figure 4:
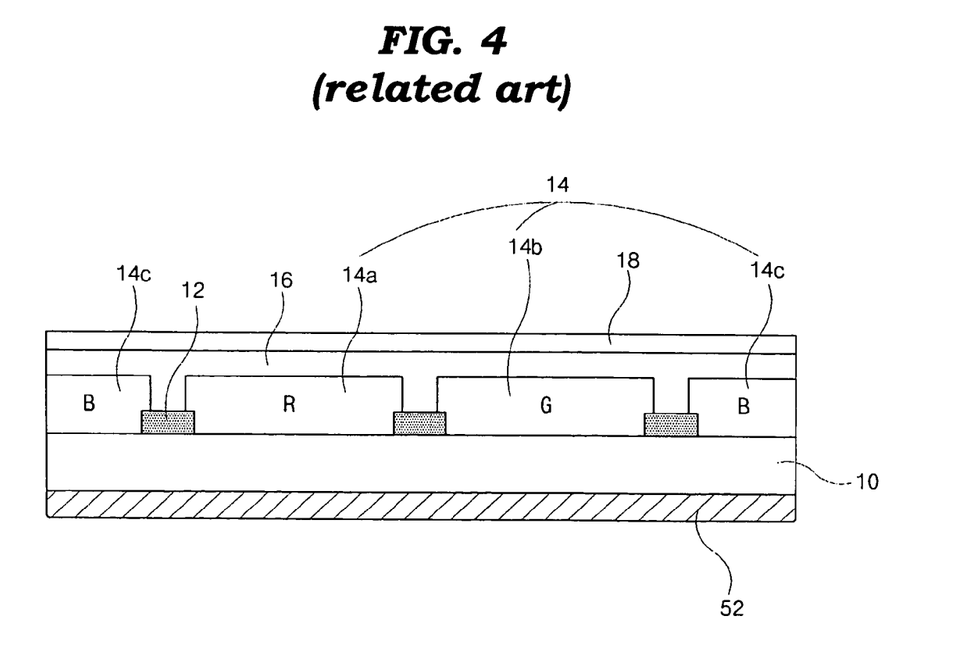
FIG. 4 is a schematic cross sectional view showing the color filter substrate, which is manufactured by the process of FIGS. 3A to 3D and has a polarizing plate.

FIG. 4 is a schematic cross sectional view showing the color filter substrate, which is manufactured by the process of FIGS. 3A to 3D and has a polarizing plate.

In FIG. 4, a polarizing plate 52 is placed on the backside of the color filter substrate 11 shown in FIGS. 2 and 3D having the black matrix 12, the color filter layer 14, the overcoat layer 16 and the common electrode 18.

However, the LCD devices according to the related art have a number of problems and limitations. For instance, the polarizing plate 52 for the color filter substrate 11 has a light damage due to an interface reflection. Further, because the thickness range of the polarizing plate 52 is more than 200 micrometers, the use of the polarizing plate 52 interferes significantly with fabricating a light-weight and slim LCD device. Furthermore, the polarizing plate 52 is expensive and the use of such polarizing plates increases the cost of the LCD device. Moreover, the polarizing plate 52 includes a base film, a polarizer layer, and the like. Because the base film is selected from a hard material, the flexibility of the base film is poor. Therefore, it is practically difficult, if not impossible, to use such polarizing plates in flexible displays.

SUMMARY OF THE INVENTION

Accordingly, the present invention is directed to a color filter substrate having a color filter layer acting as a polarizer for an LCD device and a fabricating method of the color filter substrate that substantially obviate one or more of the problems due to limitations and disadvantages of the related art.

An object of the present invention is to provide a cost-efficient, light-weight and slim LCD device by reducing or eliminating the use of separate polarizing plates.

Another object of the present invention is to provide a fabricating method of a color filter substrate having a color filter layer acting as a polarizer.

To achieve these and other advantages and in accordance with the purpose of the present invention, as embodied and broadly described, there is provided a method of fabricating a color filter layer for a display device, comprising depositing a liquid crystal material on a substrate, and applying a force on the deposited liquid crystal material in one direction to form a color filter layer having a polarizing function.

According to an aspect of the present invention, there is provided a method of fabricating a color filter substrate for a display device, comprising forming a color filter substrate having a color filter layer on a substrate, the color filter layer functioning as a polarizer.

According to an aspect of the present invention, there is provided a method of fabricating a display device, comprising forming a color filter substrate having a color filter layer on a substrate, the color filter layer functioning as a polarizer, forming an array substrate, and forming a liquid crystal layer between the color filter substrate and the array substrate.

According to an aspect of the present invention, there is provided a color filter layer structure usable in a display device, comprising a color filter layer on a substrate, the color filter layer having a polarizing function and made of a liquid crystal material deposited on the substrate, wherein a force is applied to the deposited liquid crystal material in one direction to form the color filter layer.

According to an aspect of the present invention, there is provided a color filter substrate structure usable in a display device, comprising a color filter substrate including a color filter layer on a substrate, the color filter layer functioning as a polarizer.

According to an aspect of the present invention, there is provided a display device comprising a color filter substrate having a color filter layer on a substrate, the color filter layer functioning as a polarizer, an array substrate, and a liquid crystal layer between the color filter substrate and the array substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the illustrated embodiments of the present invention, examples of which are illustrated in the accompanying drawings.

Figure 5:
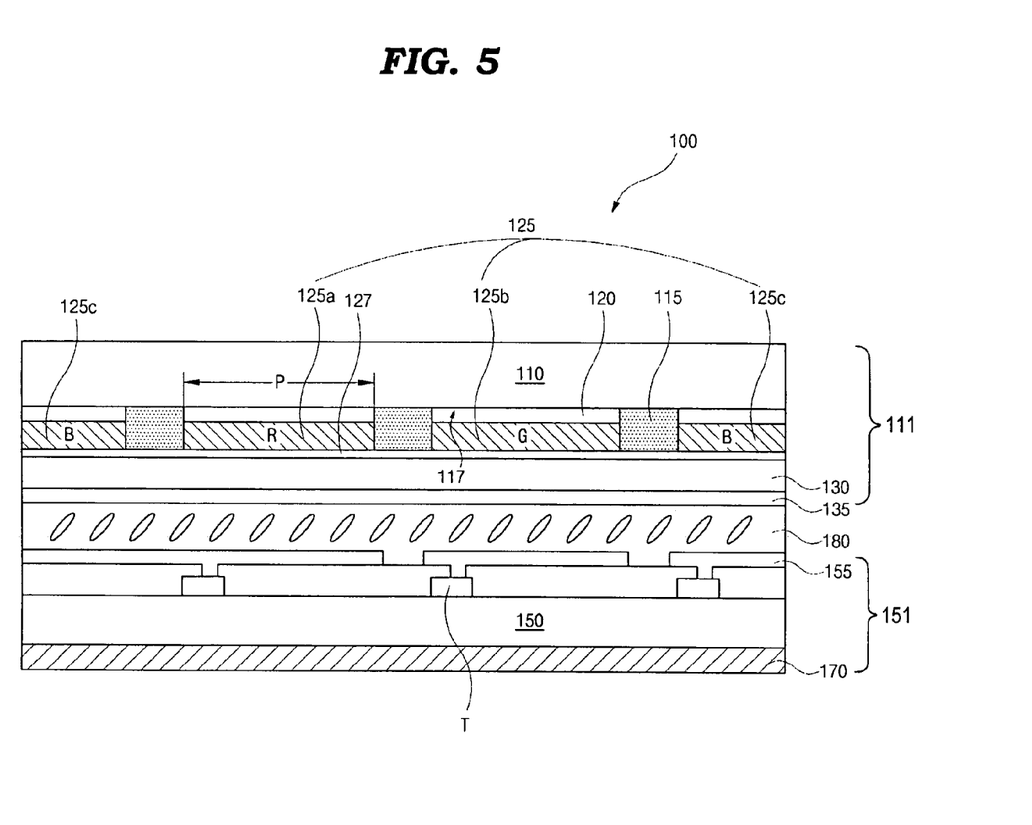
FIG. 5 is a schematic cross sectional view of an exemplary liquid crystal display device according to the present invention.

FIG. 5 is a schematic cross sectional view of an exemplary liquid crystal display device 100 according to the present invention.

Referring to FIG. 5, a color filter substrate 111 and an array substrate 151 face each other and are spaced apart from each other. A liquid crystal layer 180 is interposed between the array substrate 151 and the color filter substrate 111. A polarizing plate 170 having a first transmission axis is placed on the backside of the array substrate 151. However, the color filter substrate 111 has a color filter layer 125 acting as a polarizer and is without a separate polarizing plate.

The color filter layer 125 is made of lyotropic liquid crystal and has an orientation in perpendicular with the transmissive axis of the polarizing plate 170.

The array substrate 151 includes a first substrate 150, a plurality of thin film transistors T and a plurality of pixel electrodes 155 each connected to the respective thin film transistor T. The pixel electrodes 155 are located in the pixel regions P. The array substrate 151 further includes a plurality of gate lines and a plurality of data lines crossing the gate lines to define pixel regions P. The color filter substrate 111 includes regions corresponding to the pixel regions P of the array substrate 151.

The color filter substrate 111 includes a second substrate 110, a black matrix 115 on the second substrate 110, and a color filter layer 125. The black matrix 115 has a plurality of open portions 117 each corresponding to one pixel region P. A stabilization layer 120 is formed over the substrate 110 having the black matrix 115. Specifically, the stabilization layer 120 is located in the open portions 117 of the black matrix 115 and contacts the surface of the second substrate 110. The stabilization layer 120 is selected from one of polyamic acid and silane.

The color filter layer 125 is formed over the second substrate 110 having the stabilization layer 120. The color filter layer 125 includes red, green and blue sub-color filters 125a, 125b and 125c. Each of the red, green and blue sub-color filters 125a, 125b and 125c is located in one pixel region P. The color filter layer 125 acts as a polarizer that has the second transmission axis of a vertical direction with the first transmission axis of the polarizing plate 170. Thus, no separate polarizing plate is needed on the back side of the second substrate 110.

In addition, a barrier layer 127 is formed on the entire surface of the color filter layer 125 over the second substrate 110, an overcoat layer 130 is formed on the barrier layer 127, and a common electrode 135 is formed on the overcoat layer 130. Among them, the barrier layer 127 is formed in order to prevent moisture penetration into the color filter layer 125.

It should be noted that in the exemplary LCD device according to the present invention, the array substrate 151 has the polarizing plate 170, but the color filter substrate 111 has the color filter 125 acting as a polarizer without the use of a separate polarizing plate. Therefore, this LCD device 100 can be manufactured as a cost-effective, light-weight and slim type model. Further, the color filter substrate 111 having the color filter layer 125 also functioning as a polarizer can be applied effectively to flexible display panels.

Hereinafter, a fabricating method of the color filter substrate having a color filter layer acting as a polarizer for the LCD device will be explained.

FIGS. 6A to 6D and 7A to 7F are schematic views showing the fabricating method of a color filter substrate having a color filter layer acting as a polarizer for an LCD device according to a first embodiment of the present invention. Specifically, FIGS. 6A to 6D are plan views, and FIGS. 7A to 7F are cross-sectional views. The method of FIGS. 6A-7F are applicable to form the LCD device of FIG. 5.

Figure 6A:
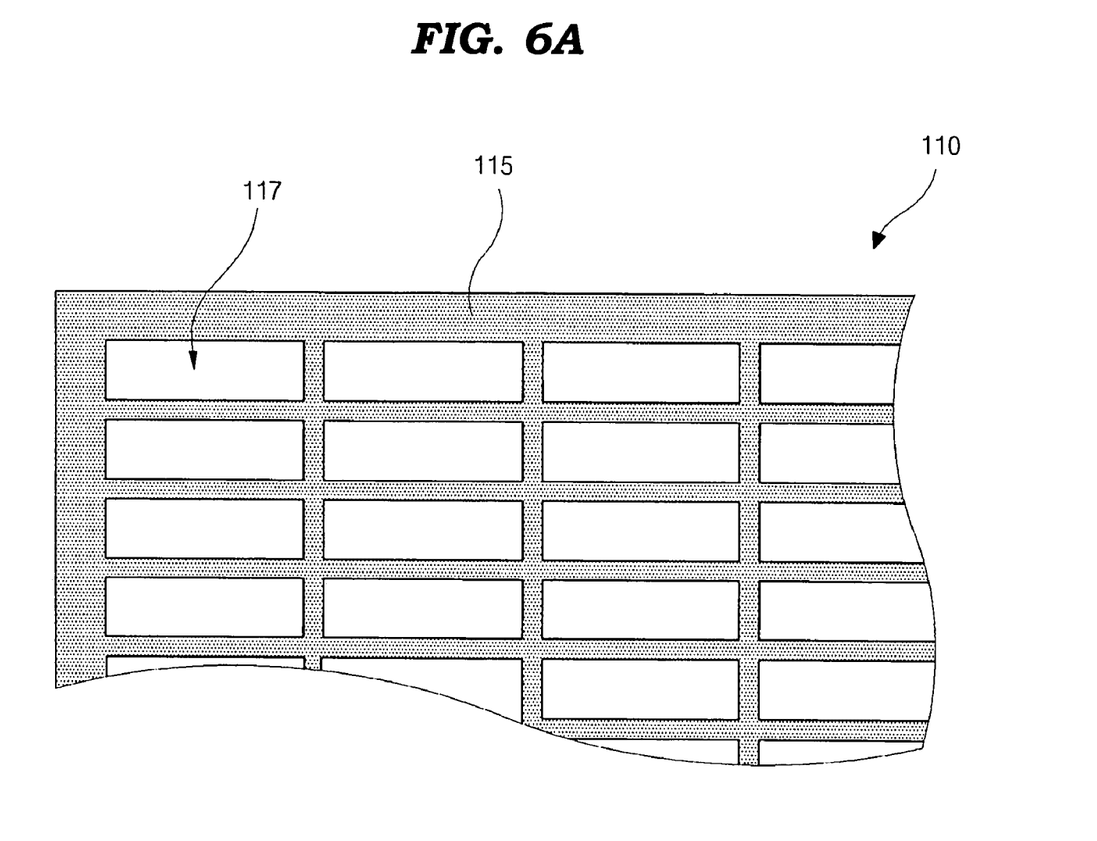
FIGS. 6A to 6D and 7A to 7F are schematic views showing a fabricating method of a color filter substrate having a color filter layer acting as a polarizer for an LCD device according to an embodiment of the present invention.
Figure 7A:
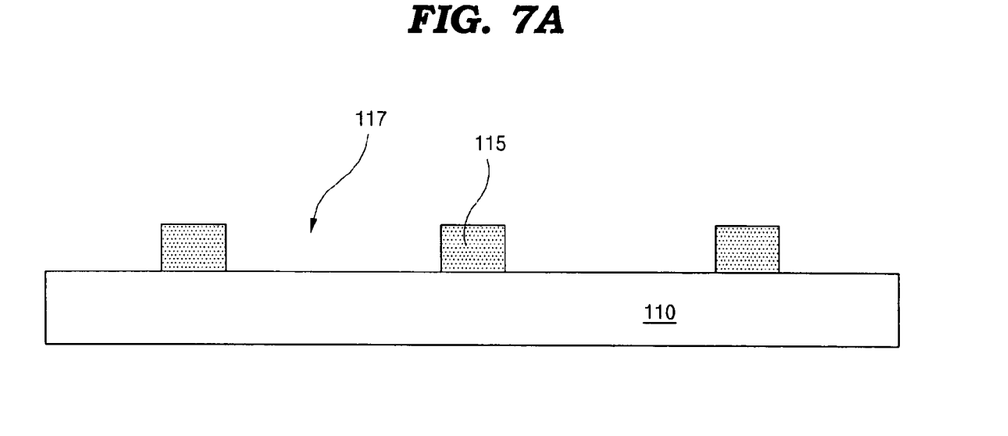

In FIGS. 6A and 7A, a black matrix 115 is formed using light interception materials through a photolithography on a substrate 110 having the pixel regions P shown in FIG. 5. The black matrix 115 is selected from one of chromium (Cr) based materials and black resin. The black matrix 1 15 has a plurality of open portions 117 corresponding to the pixel regions P.

Figure 6B:
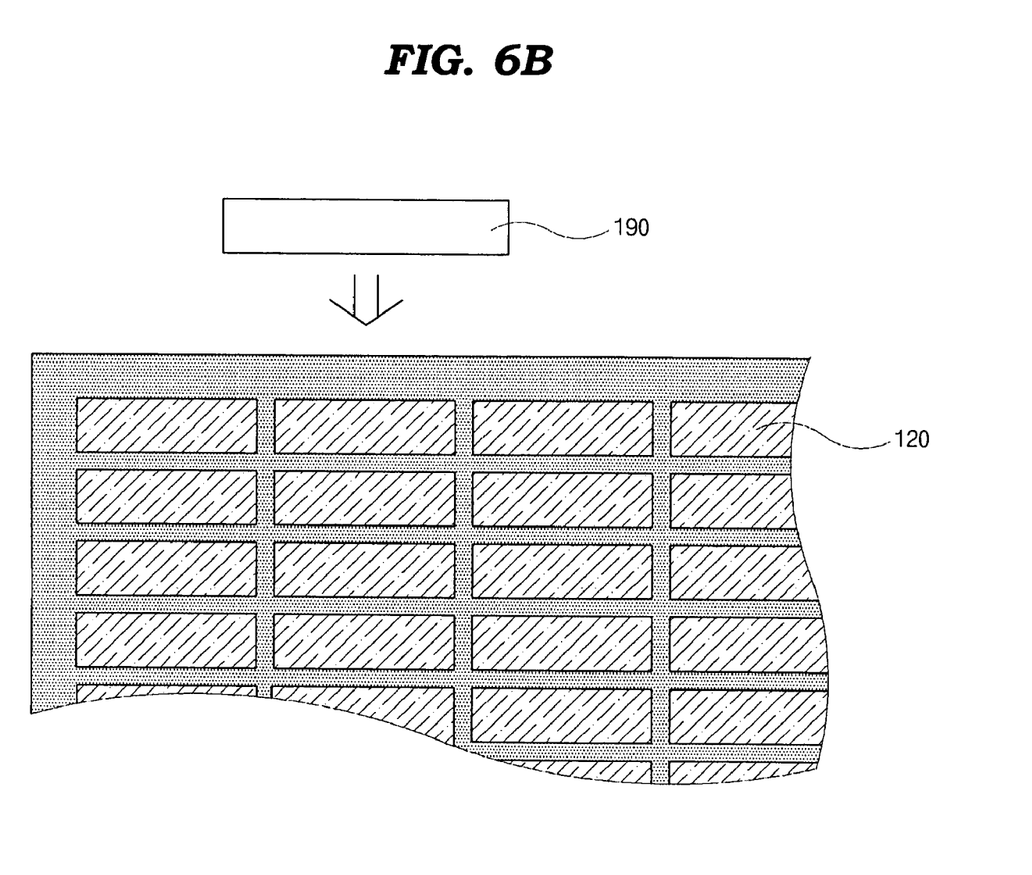
Figure 7B:
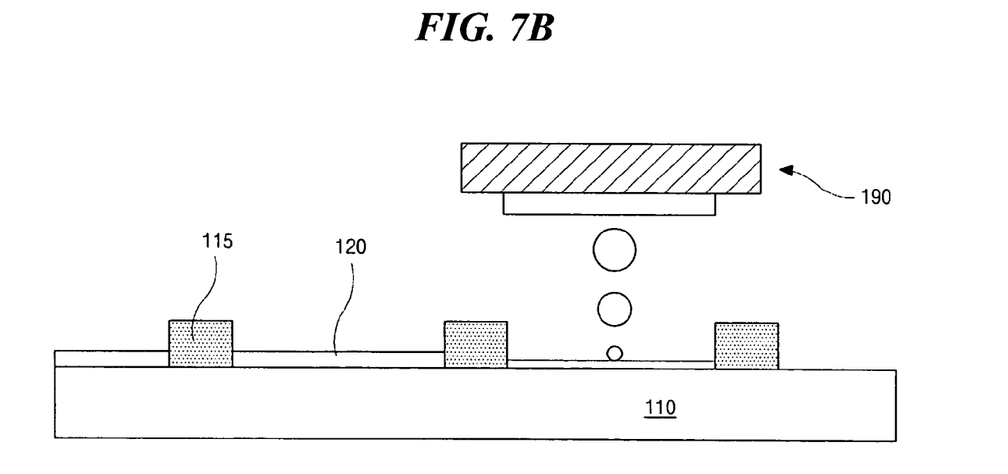

In FIGS. 6B and 7B, a stabilization layer 120 is formed by coating polyamic acid and by drying the polyamic acid layer at predetermined temperature over the substrate 110 having the black matrix 115 after the step of coating the polyamic acid layer. For example, the stabilization layer 120 may be formed in each the open portions 117 of the black matrix 115 by dispensing through a first ink jet printer 190. At this time, the stabilization layer 120 has a thickness within a range of several hundreds angstroms to about one thousand angstroms. In addition, the stabilization layer 120 has a role of increasing contact force by reacting to a color filter layer that will be formed on the stabilization layer 120 at relative high temperature.

Figure 6C:
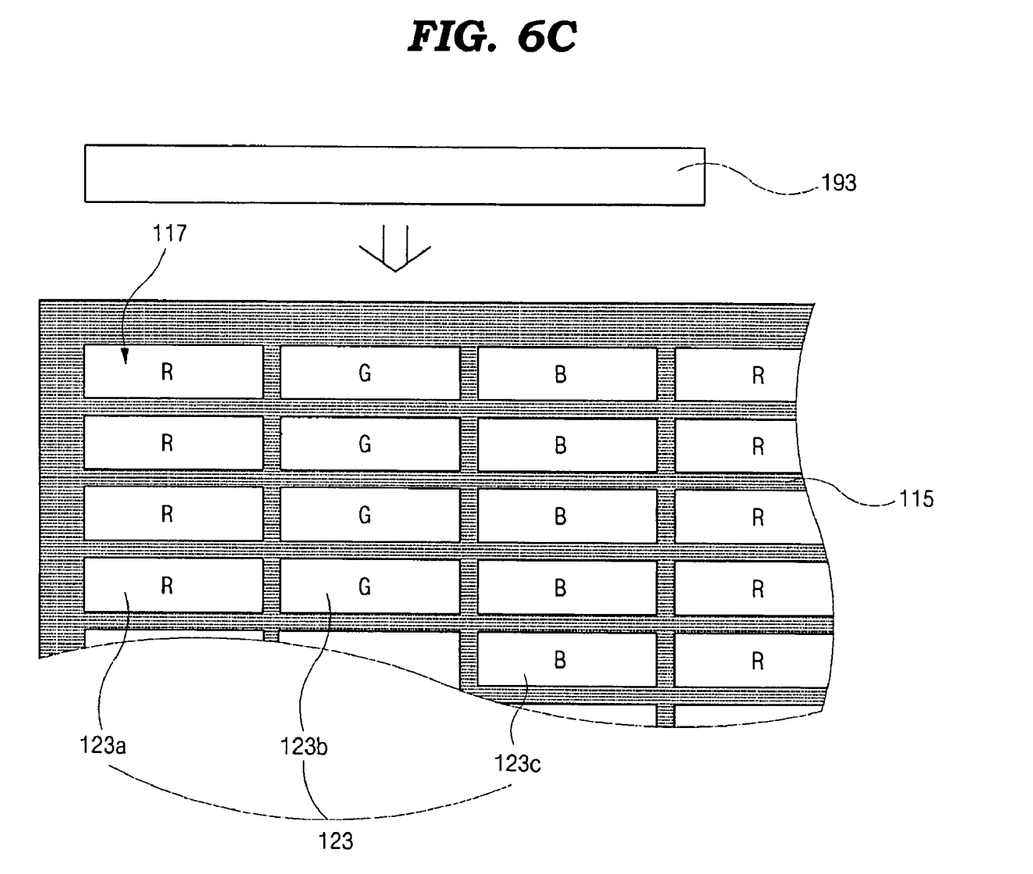
Figure 7C:
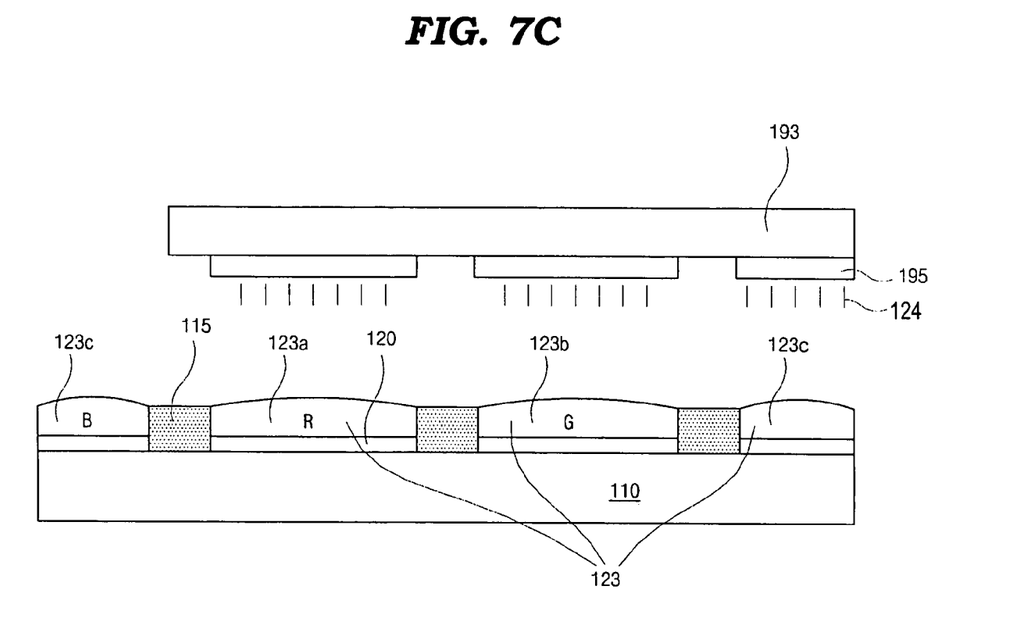

Next, in FIGS. 6C and 7C, a solution type lyotropic liquid crystal material is prepared. For example, the lyotropic liquid crystal material is a combination of amine and carboxylic acid, the combination having a predetermined composition ratio. Moreover, the solution type lyotropic liquid crystal corresponds to red, green and blue dyes based material.

A lyotropic liquid crystal layer 123 is formed by coating the solution type lyotropic liquid crystal material 124 using a second ink jet printer 193 on the substrate 110 having the stabilization layer 120 shown in FIG. 6B. The lyotropic liquid crystal layer 123 includes red, green and blue lyotropic liquid crystal layers 123a, 123b and 123c. Each of the red, green and blue lyotropic liquid crystal layers 123a, 123b and 123c is located in each open portion 117 of the black matrix 115.

For example, the red, green and blue dyes for the lyotropic crystal layer 123 correspond to the combined material of amine and carboxylic acid at a predetermined composition ratio. The liquid crystal layer 123 has a plat structure and forms a slim and long rod type aggregate in the aqueous solution. Especially, the aggregation has a role such as placing one liquid crystal in the aqueous solution.

Accordingly, as the molecules of the solution type lyotropic liquid crystal of the liquid crystal layer 123 have a liquid crystal phase, the liquid crystal phase does not depend on temperature but depends on concentration.

In the meanwhile, each of the red, green and blue lyotropic liquid crystal layers 123a, 123b and 123c is formed in each pixel region P by dispensing through a nozzle coating apparatus having three heads 195 as shown in FIG. 7C. However, the number of the heads may be variously changed, and the heads 195 may be exchanged into some nozzles.

At this time, the black matrix 115 has a hydrophobic property. On the other hand, the solution type lyotropic liquid crystal material of the liquid crystal layer 123 has a hydrophilic property. Therefore, the solution type lyotropic liquid crystal material can be easily separated from the black matrix 115 due to their different surface properties and is located on the stabilization layer 120 in the open portions 117 of the black matrix 115.

At this time, a top surface of the lyotropic liquid crystal layer 123 should be positioned higher than a tope surface of the black matrix 115 so that the surface of the lyotropic liquid crystal layer 123 has an orientation in a predetermined direction. For example, the lyotropic liquid crystal layer 123 may have a thickness within a range of about 5 micrometers to about 20 micrometers. The color purity of the lyotropic liquid crystal layer 123 can be controlled by combining the color dyes.

Figure 6D:
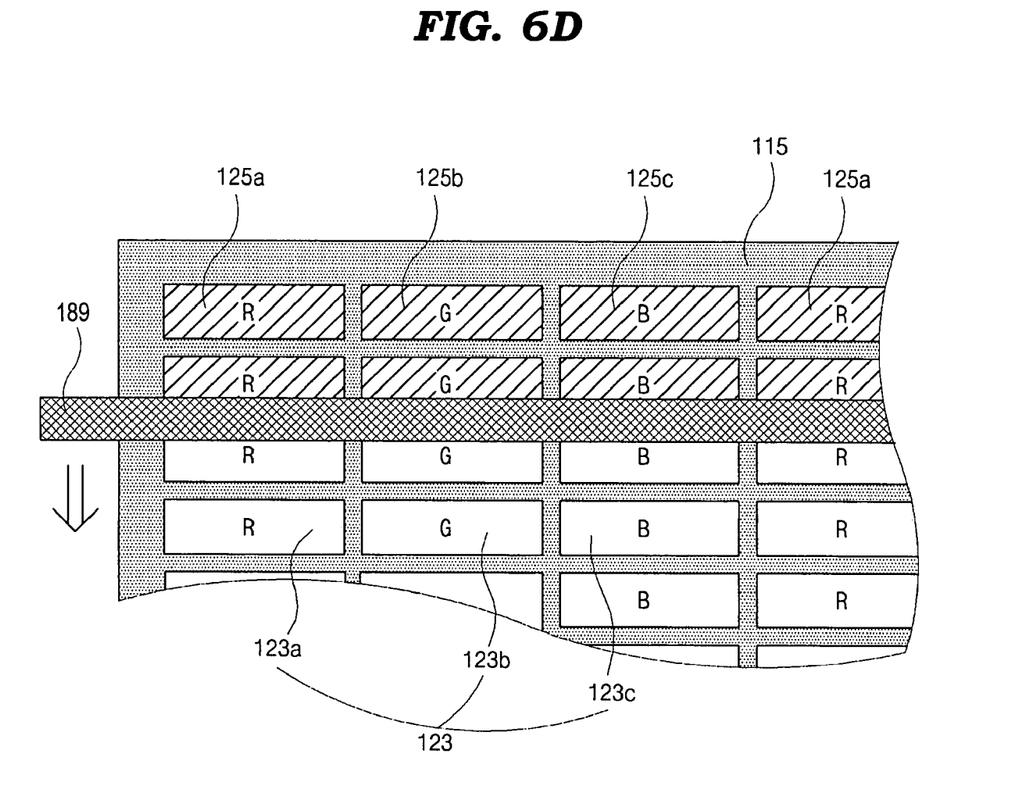
Figure 7D:
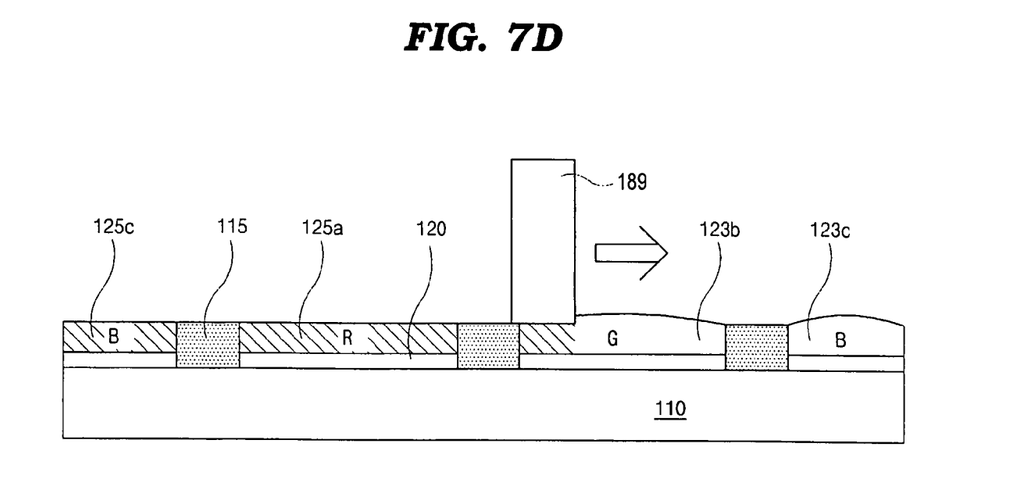

Next, in FIGS. 6D and 7D, the surface of the lyotropic liquid crystal layer 123 shown in FIG. 6C gets a proper pressure using a blade 189 of a bar coater being capable of applying shear force in one direction. This time, by moving the blade 189 or a stage for the substrate 110, the lyotropic liquid crystal layer 123 is arranged in one direction.

Simultaneously, the blade 189 makes the top surface of the lyotropic liquid crystal layer 123 flat with respect to the top surface of the black matrix 115 by removing the top-surface height difference between the lyotropic liquid crystal layer 123 and the black matrix 115.

It should be noted that the moving direction of the blade 189 or the stage is a perpendicular direction with respect to the transmission axis of the polarizing plate 170 of the array substrate 151 as shown in FIG. 5. As a result, after applying the shear force using the blade 189, a color filter layer 125 is formed with the lyotropic liquid crystal layer 123. The color filter layer 125 includes red, green and blue sub-color filters 125a, 125b and 125c formed of the red, green and blue lyotropic liquid crystal layers 123a, 123b and 123c, respectively. Especially, the color filter layer 125 acts as a polarizer having another transmission axis in perpendicular with the one transmission axis of the polarizing plate 170 of the array substrate 151 as shown in FIG. 5, because the shear force is applied in one particular direction to the lyotropic liquid crystal layer 123.

A slit coater having slit(s) can be used instead of the bar coater having the blade 189. By using the slit of the slit coater, the lyotropic liquid crystal layer 123 can also obtain an orientation in one direction.

Figure 7E:
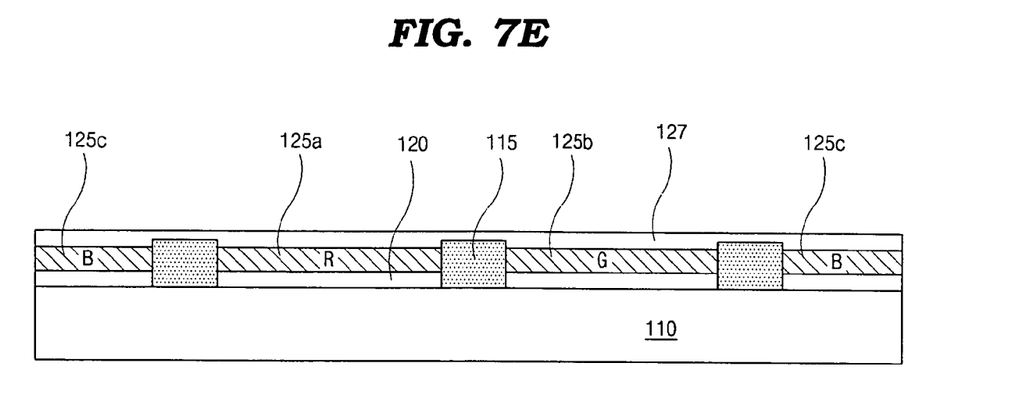

Next, FIG. 7E, because the color filter layer 125 of FIG. 7D is still a liquid state, this color filter layer is transformed into a solid type by drying at about 30° C. to about 90° C. for a predetermined time and by removing the moisture in the color filter layer 125.

Sequentially, a baking apparatus such as an oven having a chamber is prepared. The substrate 110 having the solid type color filter layer 125 is placed in the baking apparatus or other suitable heating device. Then the solid type color filter layer 125 is completely cured for about 10 minutes to about 60 minutes at about 150° C. to about 250° C. During the step or curing, one portion of the amine and carboxylic acid of the stabilization layer 120 underneath of the color filter layer 125 reacts with the stabilization layer 120, and the other of the amine and carboxylic acid of the stabilization layer 120 reacts with the lyotropic liquid crystal of the color filter layer 125. Therefore, the contact force between the stabilization layer 120 and the color filter layer 125 is increased, and the color filter layer 125 can be stably formed.

For example, the lyotropic liquid crystal layer 123 as shown in FIG. 7C may have a thickness within a range of about 5 micrometers to about 10 micrometers, and the final thickness of the color filter layer 125 formed of the lyotropic liquid crystal layer 123 may have within a range of about 0.3 micrometers to about 1.5 micrometers.

Next, a barrier layer 127 is formed on the entire surface of the color filter layer 125 using, e.g., barium chloride (BaCl) for preventing moisture penetration into the color filter layer 125.

Figure 7F:
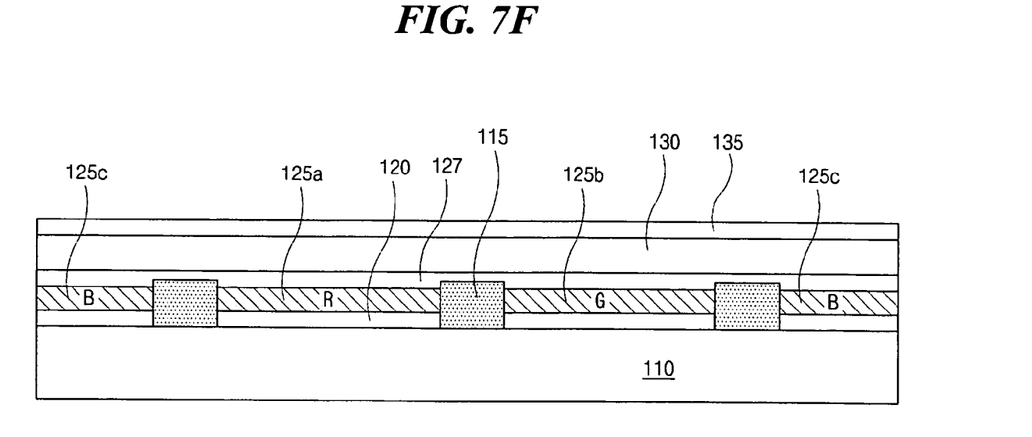

In FIG. 7F, an overcoat layer 130 is formed using organic insulating material such as transparent photo acryl on the barrier layer 127, and a common layer 135 is formed using one of transparent conductive materials such as indium tin oxide (ITO), indium zinc oxide (IZO) and indium tin zinc oxide (ITZO) on the overcoat layer 130. However, the overcoat layer 130 may be omitted.

As explained above, the color filter substrate according to the present invention includes the color filter layer acting as the polarizer that makes the light transmit in one direction. Therefore, it is not necessary to provide a separate polarizing plate. Consequently, the present invention provides a light-weight, slim, and cost-effective LCD device. Further, the color filter substrate of the present invention can be used effectively in flexible displays.

A second embodiment according to the present invention provides a fabricating method of a color filter substrate having a color filter layer acting as a polarizer. In this embodiment, instead of using the stabilization layer mode of polyamic acid, silane is used as a stabilization layer material.

Because the fabricating method of the first embodiment may be applied to the second embodiment except for the step of forming the stabilization layer, the second embodiment will be explained referring to FIGS. 6A to 6D and 7A to 7F.

At first, methoxysilane is coated over the substrate 110 having the black matrix 115. The methoxysilane is a solution type having amino and epoxy. Specifically, the methoxysilane may be dispensed by an ink jet printer or nozzle coating apparatus in the open portions 117 of the black matrix 115 as shown in FIG. 7B.

Next, a stabilization layer is formed by drying the methoxysilane layer for about 5 minutes to about 10 minutes. For example, the stabilization layer has a thickness within a range of several hundreds angstroms to about one thousand angstroms. In addition, the color filter layer 125 is formed on the stabilization layer through the same process as the first embodiment.

At this time, during the step of curing of the color filter layer 125 as explained in the first embodiment, in the second embodiment, methoxy of the silane is hydrolyzed and the hydrolyzed methoxy is firmly fixed by reacting to silicon-oxygen (Si—O—) of the substrate 110. In addition, amino or epoxy of silane reacts with the color filter layer 125, so the contact force between the color filter layer 125 and the stabilization layer made of methoxysilane increases.

The subsequent steps of the second embodiment method are the same as those of the first embodiment method and are thus omitted.

According to the present invention, because the color filter substrate includes the color filter layer acting as a polarizer, only one separate polarizing plate for the array substrate is needed. Therefore, one polarizing plate is in demand in the LCD device according to the present invention, thereby providing a cost-effective, light-weight and slim display device.

Moreover, the red, green and blue color filter layers can be simultaneously formed through one process using an ink jet printer or a nozzle coating apparatus, thereby reducing the material cost and process time. In addition, by reducing the thickness of the LCD device, the LCD device can be easily applied to a flexible display. The present invention can be applied to other display devices.

Additionally, a sheet polarizer according to the related art is an ordinarily type polarizer, but the color filter layer acting as a polarizer according to the present invention corresponds to an extraordinary type polarizer. Generally, the extraordinary type polarizer has a better viewing angle property than the ordinary type polarizer. Moreover, when the extraordinary type polarizer and the ordinary type polarizer are used as a set, the viewing angle property is far better than when the same ordinary types are used in a set. This is because the crystal axis of the polarizer can be arranged with the same direction.

It will be apparent to those skilled in the art that various modifications and variations can be made in the LCD device having patterned spacers and method of fabricating an LCD device having patterned spacers of the present invention without departing from the spirit or scope of the invention. Thus, it is intended that the present invention cover the modifications and variations of this invention provided they come within the scope of the appended claims and their equivalents.

What is claimed is:

1. A method of fabricating a color filter substrate for a display device, comprising:
   forming a color filter substrate having a color filter layer on a substrate, the color filter layer functioning as a polarizer; and
   forming a barrier layer over the color filter layer, wherein the barrier layer includes barium chloride (BaCl).

2. A method of fabricating a color filter layer for a display device, comprising:
   forming a black matrix on a substrate;
   forming a stabilization layer in at least one open portion of the black matrix, the stabilization layer including polyamic acid;
   depositing a liquid crystal material on the stabilization layer in the at least one open portion of the black matrix such that a substantially entire bottom surface of the stabilization layer is in contact with the substrate;
   applying a force on the deposited liquid crystal material in one direction to form a color filter layer having a polarizing function;
   drying the color filter layer after the step of applying the force;
   curing the color filter layer after the step of drying the color filter layer, wherein the stabilization layer reacts with the color filter layer during the step of curing the color filter layer such that a first contact force between the stabilization layer and the color filter layer after the step of curing is greater than a second contact force between the stabilization layer and the color filter layer before the step of curing; and
   forming a barrier layer over the color filter layer, wherein the barrier layer includes barium chloride (BaCl).

3. The method according to claim 2, wherein the liquid crystal material includes a lyotropic liquid crystal material.

4. The method according to claim 2, wherein the step of forming the stabilization layer includes forming the stabilization layer such that a substantially entire upper surface of the stabilization layer is in contact with a substantially entire bottom surface of the liquid crystal material.

5. A method of fabricating a color filter substrate for a display device, comprising:
   forming a black matrix on a substrate;
   forming a stabilization layer in at least one open portion of the black matrix, the stabilization layer including polyamic acid;
   forming a color filter layer on the stabilization layer in the at least one open portion of the black matrix such that a substantially entire bottom surface of the stabilization layer is in contact with the substrate, the color filter layer functioning as a polarizer, wherein the step of forming the color filter layer includes:
     depositing a liquid crystal material on the substrate; and
     applying a force on the liquid crystal material in one direction;
   drying the color filter layer after the step of applying the force;
   curing the color filter layer after the step of drying the color filter layer, wherein the stabilization layer reacts with the color filter layer during the step of curing the color filter layer such that a first contact force between the stabilization layer and the color filter layer after the step of curing is greater than a second contact force between the stabilization layer and the color filter layer before the step of curing; and
   forming a barrier layer over the color filter layer, wherein the barrier layer includes barium chloride (BaCl).

6. The method according to claim 5, wherein the step of forming the color filter substrate includes:
   forming a common electrode over the color filter layer.

7. The method according to claim 6, wherein tube step of forming the stabilization layer includes forming the stabilization layer such that a substantially entire upper surface of the stabilization layer is in contact with a substantially entire bottom surface of the color filter layer.

8. The method according to claim 7, wherein the stabilization layer has a thickness in a range of about 100 angstroms to about 1,000 angstroms.

9. The method according to claim 7, wherein the step of forming the stabilization layer comprises:
   forming a stabilization material layer using the polyamic acid in the at least one open portion of the black matrix; and
   drying the stabilization material layer.

10. The method according to claim 7, wherein the stabilization layer is formed using an ink jet printer or a nozzle coating apparatus.

11. The method according to claim 5, wherein the liquid crystal layer includes a lyotropic liquid crystal material.

12. The method according to claim 5, wherein the color filter layer polarizes light, and the one direction of the color filter layer corresponds to a transmissive axis of the color filter layer.

13. The method according to claim 5, wherein the color filter layer is formed by coating a liquid crystal material using one of an ink jet printer and a nozzle coating apparatus.

14. The method according to claim 5, wherein the step of applying the force is performed using a bar coater or a slit coater.

15. The method according to claim 5, wherein the liquid crystal material is a red, green and blue dye based solution having a combination of amine and carboxylic acid.

16. The method according to claim 5, wherein the step of drying is performed for about 1 minute to about 10 minutes at about 30° C. to about 90° C.

17. The method according to claim 5, wherein the step of curing is performed for about 10 minutes to about 60 minutes at about 150° C. to about 250° C.

18. The method according to claim 5, wherein the color filter layer has a thickness in a range of about 0.3 micrometers to about 1.5 micrometers.

19. A method of fabricating a display device, comprising:
   forming a black matrix on a color filter substrate;
   forming a stabilization layer in at least one open portion of the black matrix, the stabilization layer including polyamic acid;
   forming a color filter layer on the stabilization layer in the at least one open portion of the black matrix such that a substantially entire bottom surface of the stabilization layer is in contact with the color filter substrate, the color filter layer functioning as a polarizer, wherein the step of forming the color filter layer includes:
     depositing a liquid crystal material on the color filter substrate; and
     applying a force on the liquid crystal material in one direction;
   drying the color filter layer after the step of applying the force;
   curing the color filter layer after the step of drying the color filter layer, wherein the stabilization layer reacts with the color filter layer during the step of curing the color filter layer such that a first contact force between the stabilization layer and the color filter layer after the step of curing is greater than a second contact force between the stabilization layer and the color filter layer before the step of curing;

forming a barrier layer over the color filter layer, wherein the barrier layer includes barium chloride (BaCl);

forming an array substrate; and forming a liquid crystal layer between the color filter substrate and the array substrate.

20. The method according to claim 19, wherein the step of forming the color filter substrate includes:

forming a common electrode over the color filter layer.

21. The method according to claim 20, wherein the step of forming the stabilization layer includes forming the stabilization layer such that a substantially entire upper surface of the stabilization layer is in contact with a substantially entire bottom surface of the color filter layer.

22. The method according to claim 21, wherein the stabilization layer has a thickness in a range of about 100 angstroms to about 1,000 angstroms.

23. The method according to claim 22, wherein the step of forming the stabilization layer comprises:

forming a stabilization material layer using the polyamic acid in the at least one open portion of the black matrix; and drying the stabilization material layer.

24. The method according to claim 21, wherein the stabilization layer is formed using an ink jet printer or a nozzle coating apparatus.

25. The method according to claim 19, wherein the color filter layer includes a lyotropic liquid crystal material.

26. The method according to claim 19, wherein the color filter layer polarizes light, and the one direction of the color filter layer corresponds to a transmissive axis of the color filter layer.

27. The method according to claim 19, wherein the color filter layer is formed by coating a liquid crystal material using one of an ink jet printer and a nozzle coating apparatus.

28. The method according to claim 19, wherein the step of applying the force is performed using a bar coater or a slit coater.

29. The method according to claim 19, wherein the liquid crystal material is a red, green and blue dye based solution having a combination of amine and carboxylic acid.

30. The method according to claim 19, wherein the step of drying is performed for about 1 minute to about 10 minutes at about 30° C. to about 90° C.

31. The method according to claim 19, wherein the step of curing is performed for about 10 minutes to about 60 minutes at about 150° C. to about 250° C.

* * * * *